US012592126B2

(12) United States Patent
Cash-Silva

(10) Patent No.: US 12,592,126 B2
(45) Date of Patent: Mar. 31, 2026

(54) SYSTEMS AND METHODS OF ELECTRONIC GAMING INCLUDING GESTURE-BASED PLAYER CONSTRUCTED SYMBOL COMBINATIONS

(71) Applicant: Aristocrat Technologies Australia Pty Limited, North Ryde (AU)

(72) Inventor: Jana Rose Cash-Silva, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/053,661

(22) Filed: Nov. 8, 2022

(65) Prior Publication Data

US 2023/0082227 A1 Mar. 16, 2023

Related U.S. Application Data

(63) Continuation of application No. 16/985,911, filed on Aug. 5, 2020, now Pat. No. 11,514,754, which is a continuation of application No. 16/109,362, filed on Aug. 22, 2018, now Pat. No. 10,748,384.

(51) Int. Cl.
*G07F 17/32* (2006.01)
*G07F 17/34* (2006.01)

(52) U.S. Cl.
CPC ...... *G07F 17/3262* (2013.01); *G07F 17/3209* (2013.01); *G07F 17/3213* (2013.01); *G07F 17/3216* (2013.01); *G07F 17/3258* (2013.01); *G07F 17/34* (2013.01)

(58) Field of Classification Search
None
See application file for complete search history.

(56) References Cited

U.S. PATENT DOCUMENTS 10,282,938 B1 5/2019 Halvorson
10,373,441 B1 8/2019 Halvorson
10,636,243 B1 * 4/2020 Davis .................. G07F 17/3209
(Continued)

OTHER PUBLICATIONS

Notice of Allowance dated Apr. 16, 2020 for U.S. Appl. No. 16/109,362 (pp. 1-8).
(Continued)

*Primary Examiner* — Peter J Iannuzzi
(74) *Attorney, Agent, or Firm* — Armstrong Teasdale LLP

(57) ABSTRACT

In one aspect, an electronic gaming machine includes a game controller that executes instructions that cause the game controller to: (i) display a plurality of reels to form a matrix of symbol positions; (ii) simulate spinning the plurality of reels; (iii) display a plurality of player-populated symbol positions within the matrix; (iv) display a first player-selectable symbol of a sequence of player-selectable symbols; (v) receive, during the spinning, an add gesture associated with the first player-selectable symbol representing a request for addition of the first player-selectable symbol to the matrix; (vi) add the first player-selectable symbol to a first player-populated symbol position in response to the add gesture; (vii) simulate stopping each reel of the plurality of reels, the first player-selectable symbol overlaying a reel symbol at the first player-populated symbol positions; and (viii) evaluate the symbols displayed within the matrix to determine a game outcome.

20 Claims, 8 Drawing Sheets

(56) References Cited

U.S. PATENT DOCUMENTS

| | | | | |
|---|---|---|---|---|
| 10,748,384 | B2 | 8/2020 | Cash-Silva | |
| 11,514,754 | B2 * | 11/2022 | Cash-Silva | G07F 17/3262 |
| 2004/0002774 | A1 * | 1/2004 | Conti | H04N 21/44231 700/11 |
| 2006/0084486 | A1 | 4/2006 | Belger | |
| 2008/0188278 | A1 | 8/2008 | Paulsen | |
| 2008/0254854 | A1 * | 10/2008 | Slomiany | G07F 17/32 463/19 |
| 2009/0064055 | A1 | 3/2009 | Chaudhri | |
| 2009/0131150 | A1 | 5/2009 | Iverson | |
| 2009/0186686 | A1 | 7/2009 | Shai-Hee | |
| 2009/0197667 | A1 | 8/2009 | Kim | |
| 2010/0016058 | A1 | 1/2010 | Englman | |
| 2010/0130281 | A1 | 5/2010 | Little | |
| 2010/0190543 | A1 | 7/2010 | Englman | |
| 2012/0208613 | A1 | 8/2012 | Barbalet | |
| 2015/0287269 | A1 | 10/2015 | Berman | |
| 2015/0363998 | A1 | 12/2015 | Comeau | |
| 2016/0140794 | A1 | 5/2016 | Tanner | |
| 2019/0164382 | A1 | 5/2019 | Maddux | |

OTHER PUBLICATIONS

Office Action (Non-Final Rejection) dated Jun. 24, 2022 for U.S. Appl. No. 16/985,911 (pp. 1-5).

Office Action (Notice of Allowance and Fees Due (PTOL-85)) dated Aug. 3, 2022 for U.S. Appl. No. 16/985,911 (pp. 1-5).

Australian Examination Report No. 1 issued in App. No. AU2019219796, dated Jul. 11, 2024, 4 pages.

* cited by examiner

SYSTEMS AND METHODS OF ELECTRONIC GAMING INCLUDING GESTURE-BASED PLAYER CONSTRUCTED SYMBOL COMBINATIONS

CROSS REFERENCE TO RELATED APPLICATIONS

This application is a continuation of and claims priority to U.S. patent application Ser. No. 16/985,911, filed Aug. 5, 2020, which is a continuation of U.S. patent application Ser. No. 16/109,362, now U.S. Pat. No. 10,748,384, filed Aug. 22, 2018, all of which are incorporated herein by reference in their entireties.

TECHNICAL FIELD

The field of disclosure relates generally to electronic gaming, and more particularly, to systems and methods of electronic gaming including gesture-based player constructed symbol combinations on one or more rows and/or columns of a matrix of symbol positions.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix," which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

As described above, many EGMs are configured to display a plurality of reels, each of which may be spun and stopped, to display a plurality of symbols from each reel in a matrix of symbol positions. The symbols displayed from each stopped reel may be evaluated, such as by a computer processor, to determine whether any combination of symbols appearing in the matrix corresponds to a game award. Such known games do not include player-populated symbol positions that are not filled from the reels when they are spun and stopped. Further, such known games do not include a symbol display area that displays a sequence of player-selectable symbols for addition to or discard from one or more empty player-populated symbol positions of the matrix.

Accordingly, systems and methods for electronic gaming in which one or more rows and/or columns of empty symbol positions are not filled from the reels when they are spun and stopped are desirable. Further, systems and methods in which one or more rows and/or columns are held stationary while other rows and/or columns are spun are desirable. In addition, systems and methods including a symbol display area that displays a sequence of player-selectable symbols for addition to or discard from one or more empty symbol positions of the matrix are desirable.

BRIEF DESCRIPTION

In one aspect, an electronic gaming machine is provided. The electronic gaming machine includes a game controller that executes instructions that cause the game controller to at least: (i) display, on the display, a plurality of reels, wherein each reel includes a plurality of symbol positions, wherein each symbol position is configured to include an associated symbol, wherein each reel is adjacent at least one other reel to form a matrix of symbol positions; (ii) simulate spinning the plurality of reels; (iii) display, during the spinning, a plurality of player-populated symbol positions within the matrix of symbol positions; (iv) display, on the display, a first player-selectable symbol of a sequence of player-selectable symbols in a display area separate from the matrix of symbol positions; (v) receive, during the spinning, an add gesture associated with the first player-selectable symbol, the add gesture is configured to represent a request by the player for addition of the first player-selectable symbol to the matrix; (vi) add the first player-selectable symbol to a first player-populated symbol position of the plurality of player-populated symbol positions in response to the add gesture; (vii) simulate stopping each reel of the plurality of reels, the stopping revealing symbols of the plurality of reels within the matrix, the first player-selectable symbol overlaying a reel symbol at the first player-populated symbol positions; and (viii) evaluate the symbols displayed within the matrix to determine a game outcome.

In another aspect, a method for adding player-selectable symbols to one or more reels during play of a wagering game on an electronic gaming machine is provided. The method includes: (i) displaying, on the display, a plurality of reels, wherein each reel includes a plurality of symbol positions, wherein each symbol position is configured to include an associated symbol, wherein each reel is adjacent at least one other reel to form a matrix of symbol positions; (ii) simulating spinning the plurality of reels; (iii) displaying, during the spinning, a plurality of player-populated symbol positions within the matrix of symbol positions; (iv) displaying, on the display, a first player-selectable symbol of a sequence of player-selectable symbols in a display area separate from the matrix of symbol positions; (v) receiving, during the spinning, an add gesture associated with the first player-selectable symbol, the add gesture is configured to represent a request by the player for addition of the first player-selectable symbol to the matrix; (vi) adding the first player-selectable symbol to a first player-populated symbol position of the plurality of player-populated symbol positions in response to the add gesture; (vii) simulating stopping each reel of the plurality of reels, the stopping revealing symbols of the plurality of reels within the matrix, the first player-selectable symbol overlaying a reel symbol at the first player-populated symbol positions; and (viii) evaluating the symbols displayed within the matrix to determine a game outcome.

In yet another aspect, a computer-readable storage medium is provided. The computer-readable storage medium has computer-executable instructions embodied thereon, which when executed by a game controller of an electronic gaming machine, cause the game controller to at least: (i) display, on a display, a plurality of reels, wherein each reel includes a plurality of symbol positions, wherein each symbol position is configured to include an associated symbol, wherein each reel is adjacent at least one other reel to form a matrix of symbol positions; (ii) simulate spinning the plurality of reels; (iii) display, during the spinning, a plurality of player-populated symbol positions within the matrix of symbol positions; (iv) display, on the display, a first player-selectable symbol of a sequence of player-selectable symbols in a display area separate from the matrix of symbol positions; (v) receive, during the spinning, an add gesture associated with the first player-selectable symbol, the add gesture is configured to represent a request by the player for addition of the first player-selectable symbol to the matrix; (vi) add the first player-selectable symbol to a first player-populated symbol position of the plurality of player-populated symbol positions in response to the add gesture; (vii) simulate stopping each reel of the plurality of reels, the stopping revealing symbols of the plurality of reels within the matrix, the first player-selectable symbol overlaying a reel symbol at the first player-populated symbol positions; and (viii) evaluate the symbols displayed within the matrix to determine a game outcome.

BRIEF DESCRIPTION OF THE DRAWINGS

An example embodiment of the subject matter disclosed will now be described with reference to the accompanying drawings.

DETAILED DESCRIPTION

The wagering game described herein may include a plurality of reels and a symbol display area. The plurality of reels define a matrix of symbol positions, some of which may be empty, some of which may be filled or populated from the reels as they are spun and stopped, and some of which may be populated by a player from a sequence of player-selectable symbols displayed in a symbol display area. For example, during play of the wagering game, a sequence of player-selectable symbols may be displayed in the symbol display area as the reels are spun. A player may select one or more of these player-selectable symbols for addition to the empty symbol positions of the matrix. Likewise, the player may discard some of these player-selectable symbols to exclude the discarded symbol or symbol from the empty symbol positions of the matrix.

A variety of player gestures may be used to control an action taken with respect to each player-selectable symbol. For example, an "add gesture," such as a right-swipe and/or an up-swipe on a touch-screen display, may cause a currently-displayed player-selectable symbol to be added to an empty symbol position of the matrix. Conversely, a "discard gesture," such as a left-swipe and/or a down-swipe, may cause a displayed player-selectable symbol to be discarded, such that the discarded symbol is not added to the matrix. When at least some of the empty symbol positions of the matrix are filled with player selected player-selectable symbols, the reels may be stopped and the symbols in each symbol position of the matrix, including symbols from the reels and player selected player-selectable symbols, may be evaluated to determine whether the player has achieved a winning game outcome.

Figure 1:
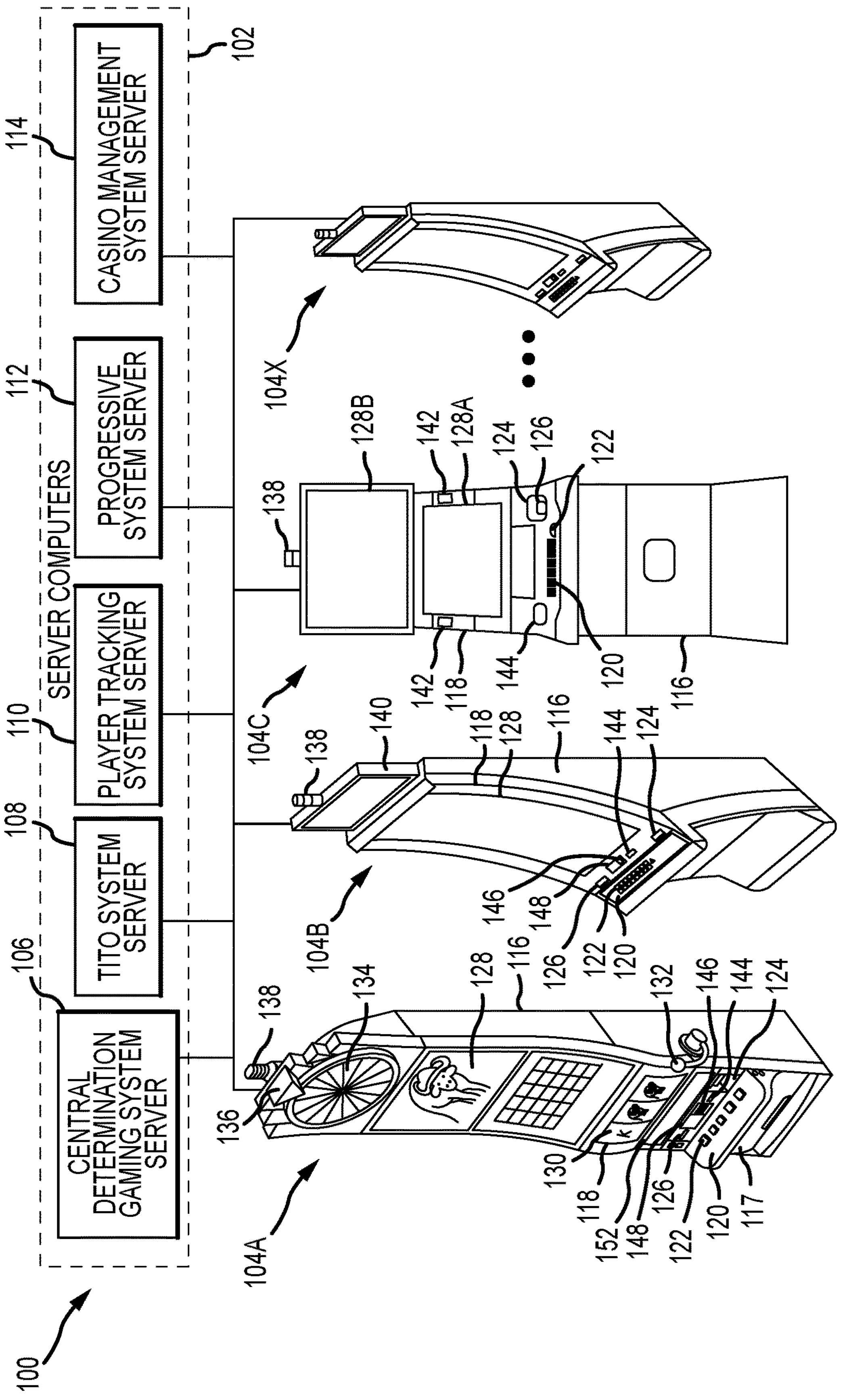
FIG. 1 is a diagram of exemplary EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door that provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In some embodiments, bill validator 124 may also function as a “ticket-in” reader that enables the player to use a casino-issued credit ticket to load credits onto gaming device 104A (e.g., in a cashless TITO system). In such cashless embodiments, gaming device 104A may also include a “ticket-out” printer 126 for outputting a credit ticket when a “cash out” button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player’s smartphone, a keypad 146, and/or an illuminated display 148 for reading, receiving, entering, and/or displaying player tracking information can be provided. In such embodiments, a game controller within gaming device 104A communicates with player tracking server 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
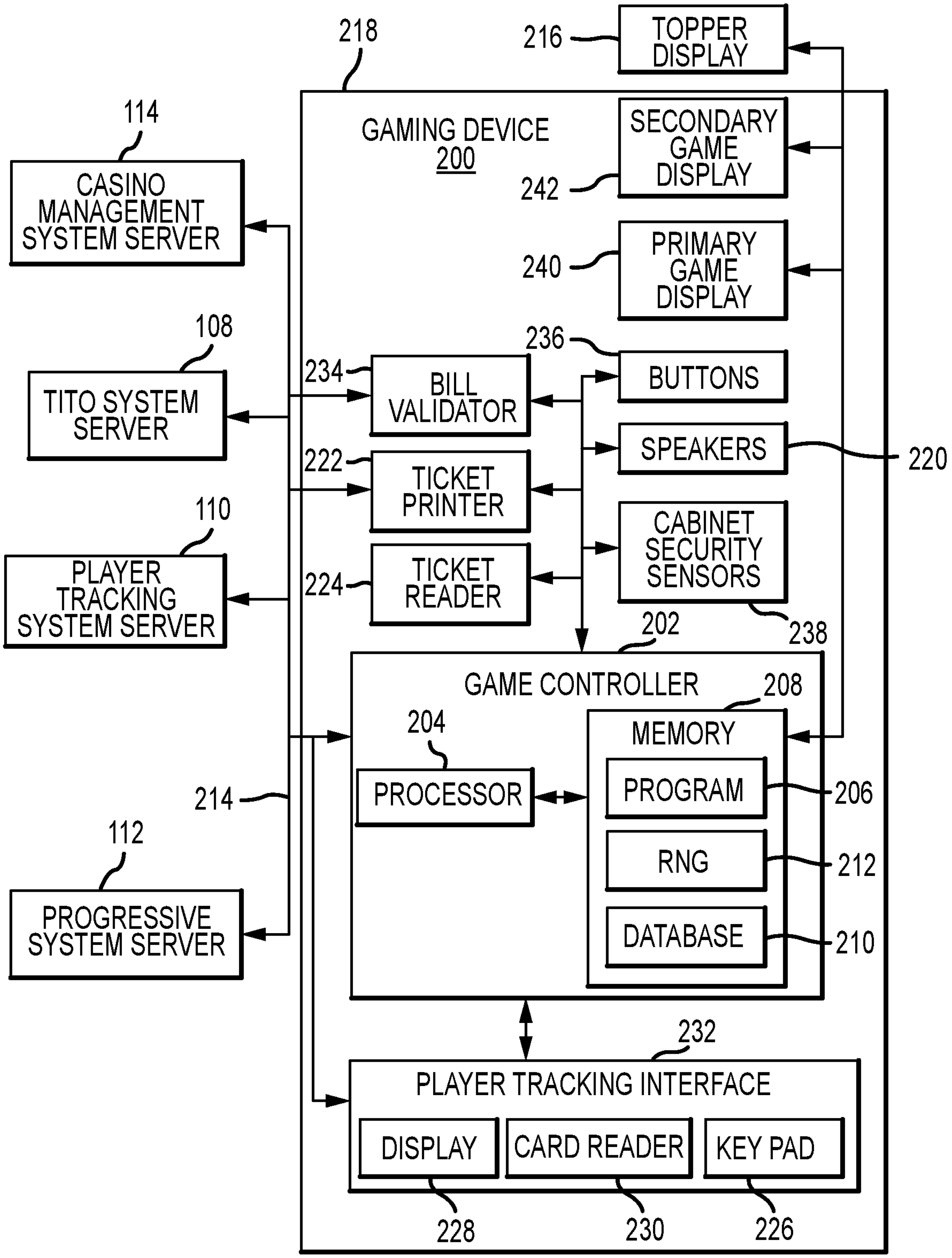
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

An alternative example gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Example gaming device 104B includes main cabinet 116 having main door that opens to provide access to the interior of gaming device 104B. Main door, or service door, is typically used by service personnel to refill ticket-out printer 126 and collect bills and tickets inserted into bill validator

124. Main door may further be accessed to reset the machine, verify and/or upgrade the software, and for general maintenance operations.

Another example gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A may include a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204. Note that embodiments of the present disclosure represent an improvement in the art of EGM software and provide new technology in that they provide skill-based ways in which the player can appear to affect aspects of the outcome of main or bonus games. These embodiments are thus not merely new game rules or simply a new display pattern.

Gaming device 200 includes a topper display 216. In an alternative embodiment, gaming device 200 includes another form of a top box such as, for example, a topper wheel, or other topper display that sits on top of cabinet 218. Cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232*a*. Player tracking interface 232*a* may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, player-input buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232*a* to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome one or more of the primary game display 240 and secondary game display 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
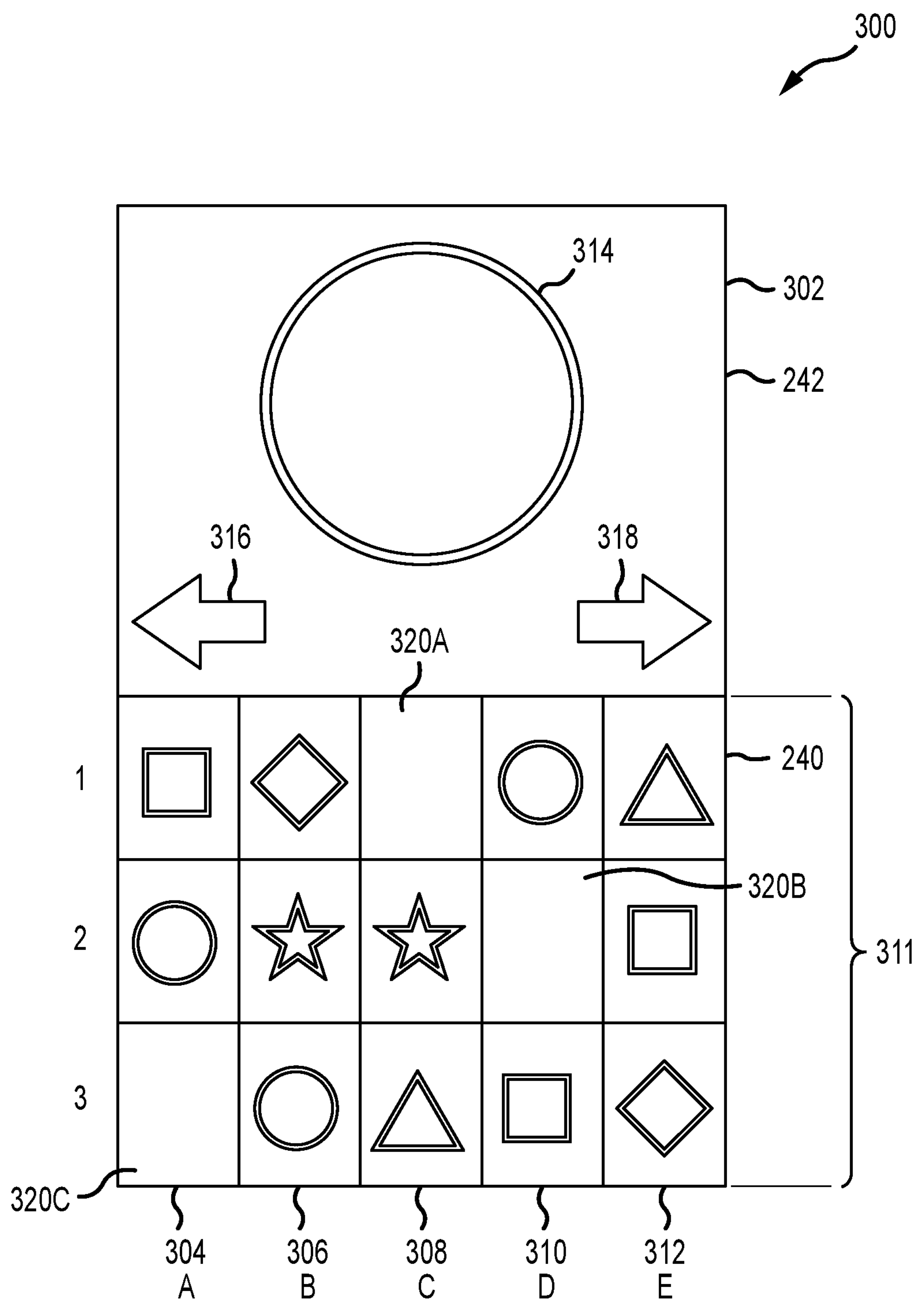
FIG. 3 is a schematic view of an exemplary wagering game.

FIG. 3 is a schematic view of an exemplary wagering game 300. In the exemplary embodiment, wagering game 300 includes a player-selectable symbol display area 302 (or "symbol display area" for brevity) and a plurality of reels, such as a first reel 304, a second reel 306, a third reel 308, a fourth reel 310, and a fifth reel 312. Reels 304-312 may include simulated or "virtual" reels generated and displayed by game controller 202 on primary game display 240 and/or secondary game display 242.

In the exemplary embodiment, reels 304-312 are displayed on primary game display 240. In other embodiments, reels 304-312 may include one or more physical or mechanical reels having a display element, such as a liquid crystal display (LCD), capable of displaying one or more symbols during gameplay. In still other embodiments, reels 304-312 may include a plurality of mechanical reels overlaid by an LCD panel. Further, in the exemplary embodiment, symbol display area 302 is displayed on secondary game display 242, such as, for example, in an orientation or position which permits a player to interact with symbol display area 302 while also viewing reels 304-312.

Each reel 304-312 may include a plurality of symbols, and symbols from each reel 304-312 may be displayed in one of a plurality of symbol positions, which may, together, define a matrix 311 of symbol positions. Each symbol position may be designated by a row number (e.g., "1," "2," "3," etc.) and a column letter (e.g., "A," "B," "C," "D," "E," etc.) For example, the upper-left-most symbol position, occurring on reel 304 at the intersection of row 1 and column A, may be designated by the symbol position "1A." Thus, reels 304-312 may define a matrix 311 of symbol positions, and the matrix 311 may include a plurality of rows (e.g., rows "1," "2," "3," etc.) and a plurality of columns (e.g., "A," "B," "C," "D," "E," etc.). In some embodiments, any or all of the symbol positions within the matrix 311 may represent unisymbol or independent reels. With unisymbol reels, a symbol position is supported by its own dedicated reel, where only one symbol from that underlying unisymbol reel is displayed in the symbol position after a spin. For example, in an example embodiment where all of the symbol positions of matrix 311 are unisymbol reels, there are 15 reels included in the wagering game 300, one for each of the 15 symbol positions.

During gameplay, one or more reels 304-312 may be spun virtually and stopped to display a subset of the symbols of one or more reels 304-312. In particular, in at least some embodiments, one or more reels 304-312 may be spun and stopped in response to a credit wager placed by a player (e.g., which a player may place by selecting a "spin" button). In at least some embodiments, three symbol positions of one or more reels 304-312 may be selected, stopped, and displayed by game controller 202 for presentation to a player.

More particularly, as described herein, each reel 304-312 may be spun, such as in response to selection of a "spin" button by a player. However, unlike many traditional reel games, in wagering game 300, one or more symbol positions may be overlaid (e.g., initially displayed as empty symbol positions) and remain fixed while the reels 304-312 spin. These overlaid, fixed symbol positions may be referred to herein as "player-populated symbol positions," and the number of player-populated symbol positions may be represented as P. In the example shown in FIG. 3, the wagering game 300 presents three player-populated symbol positions 320A, 320B, 320C (collectively, player-populated symbol positions 320) (e.g., P=3). In other embodiments, all of the symbol positions in one or more columns "A," "B," "C," "D," "E," or one or more rows "1," "2," "3," may be player-populated symbol positions, and thus may be overlaid with player-selectable symbols and remain fixed while the other symbol positions are spun. For example, in one embodiment, rows "1" and "3" (comprised of non-fixed symbol positions) may present a spin of the reels 304-312 while row "2" remains fixed and displays blank player-populated symbol positions 320 and player selected symbols as described herein (e.g., where P=5). The term "non-fixed symbol position" may be used to refer to symbol positions that are not player-populated symbol positions (e.g., all of the symbol positions of matrix 311 except symbol positions 320A, 320B, and 320C.

Visually, therefore, reels 304-312 may only appear to spin on the non-fixed symbol positions while the player-populated symbol positions 320 appear to remain stationary as reels 304-312 are spun. Moreover, as described in greater detail below, the player-populated symbol positions 320 may not initially be filled with symbols from reels 304-312. Rather, the player-populated symbol positions 320 may begin as empty or unfilled symbol positions, which may be populated or filled with symbols based upon one or more symbol selections by a player from player-selectable symbol display area 302. In some embodiments, reels 304-312 may spin on all symbol positions, while the player-populated symbol positions 320 are not initially filled with symbols from reels 304-312.

Further, although embodiments are described herein in which player-populated symbol positions 320 are fixed and are filled with player-selectable symbols from player-selectable symbol display area 302, it will be appreciated that any number and combination of symbol positions may be player-populated symbol positions 320 and filled with one or more player-selectable symbols and/or held stationary while any other column(s) and/or row(s) are spun. In other words, in broad terms, any symbol position of any spinning and/or non-spinning row(s) and/or column(s) may be filled, as described herein, with one or more player-selectable symbols. In some embodiments, empty symbol positions may appear to spin, and in other embodiments, empty symbol positions may be held fixed.

In some embodiments, the number of player-populated symbol positions 320, P, may be a pre-determined, fixed number (e.g., P=3). In some embodiments, the number or position of player-populated symbol positions 320 may be randomly determined. In some embodiments, the number of player-populated symbol positions 320, P, may be dynamically determined based on an outcome of a preceding game (e.g., a base game). For example, the wagering game 300 may provide one player-populated symbol position 320 for each feature symbol appearing in an outcome of the base game. In some embodiments, the position of the player-populated symbol positions 320 may be determined based on the position of the feature symbols (e.g., providing a player-populated symbol position 320 at each location of a feature symbol).

Figure 4:
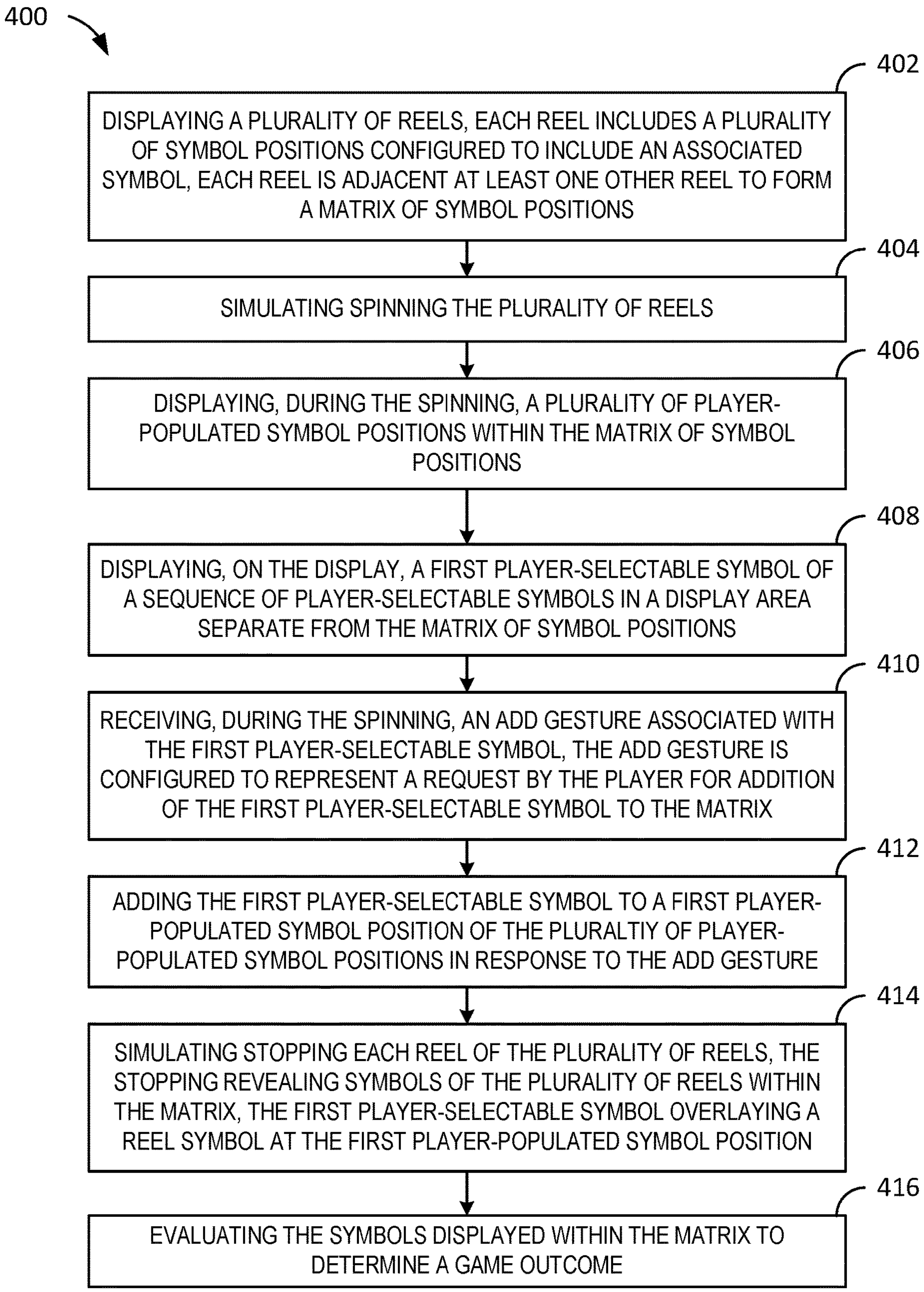
FIG. 4 is a flowchart illustrating an exemplary process for playing the wagering game.

FIG. 4 is a flowchart illustrating an exemplary process 400 for playing wagering game 300 (shown at FIG. 3). In the exemplary embodiment, game controller 202 may, as described above, display a plurality of reels, such as reels 304-312, on a display of an EGM 104A-104X, such as, for example, on primary game display 240 (step 402). Moreover, as described above, reels 304-312 may define a matrix 311 of symbol positions, which may include one or more columns (e.g., columns "A," "B," "C," "D," "E," etc.) and/or one or more rows (e.g., rows "1," "2," "3," etc.), as well as one or more player-populated symbol positions 320.

Game controller 202 may, in addition, simulate spinning of reels 304-312 within columns "A," "B," "C," "D," "E," etc. (step 404). In various embodiments, each reel 304-312 may include a plurality of symbols, such as only a few symbols to several thousand symbols. Thus, each time reels 304-312 are spun and stopped, a subset of the symbols included on each reel 304-312 may be selected by game controller 202 (e.g., based upon a random number or otherwise based upon a random determination) and displayed in a corresponding symbol position. For example, as shown at FIG. 3, if matrix 311 of symbol positions includes fifteen symbol positions (e.g., five columns and three rows of symbol positions), fifteen (or fewer, as described below) symbols may be selected from each of reels 304-312 for display in at least some of the symbol positions of matrix 311.

More particularly, as described above, although matrix 311 may include, as an example, fifteen symbol positions, in at least one embodiment, game controller 202 displays a plurality of player-populated symbol positions 320 within the matrix of symbol positions (step 406). Player-populated symbol positions 320 may not be filled with symbols from reels 304-312 when reels 304-312 are spun. In the example of FIG. 3, the player-populated symbol positions 320 are not filled with symbols when reels 304-312 are spun (e.g., as a first spin of a bonus or feature game). Rather, the player-populated symbol positions 320 remain empty or unfilled and do not appear to rotate, in at least some embodiments, while reels 304-312 are spun. Specifically, the player-populated symbol positions 320 are not filled from reels 304-312 but are instead filled from the player-selectable symbols presented to the player in symbol display area 302. Accordingly, as shown in the example, the symbol positions of the non-fixed symbol positions are populated with symbols from reels 304-312. Thus, in at least one embodiment, reels 304-312 may appear to spin on the non-fixed symbol positions while the player-populated symbol positions 320 are fixed.

Now with greater attention to symbol display area 302, in addition to spinning reels 304-312, game controller 202 may also display (or cause to be displayed) a sequence of player-selectable symbols within symbol display area 302, which may be presented or positioned, for example, above or below reels 304-312 (step 408). In various embodiments, the sequence of player-selectable symbols may be randomly determined by game controller 202, and each player-selectable symbol of the sequence may be displayed within symbol display area 302 in order (e.g., from the sequence), such as, for example, by displaying each player-selectable symbol in symbol display area 302 one at a time.

For instance, as shown at FIG. 3, the first player-selectable symbol 314 is displayed within symbol display area 302. First player-selectable symbol 314 may be a first symbol of a randomly generated sequence of such symbols, each of which may be presented, one at a time, to the player for one of selection for addition to one of the player-populated symbol positions 320 or for discarding, depending upon a preference of the player. The sequence may include a total number, T, of player-selectable symbols when it is generated by game controller 202. In an example embodiment, the number of player-selectable symbols, T, is determined based on adding the number of player-populated symbol positions, P, and a number of "discard" actions, D, allowed by the player (e.g., T=P+D). In some embodiments, the sequence includes a number of player-selectable symbols at least equal to a number of player-populated symbol positions 320 (T≥P).

Each player-selectable symbol presented by game controller 202 within symbol display area 302 may be selectable, as described below, by the player, and game controller 202 may receive, during the spinning, an add gesture of a player-selectable symbol presented from the sequence within symbol display area 302, the add gesture being configured to represent a request by the player for addition of the player-selectable symbol to the matrix (step 410). As described herein, a player selection may be either of a selection indicating that a player would like to "keep" a particular player-selectable symbol (e.g., for addition to one of the player-populated symbol positions 320 of matrix 311) or a selection indicating that the player would prefer to discard the player-selectable symbol (e.g., such that the discarded symbol is not added to any of the player-populated symbol positions 320).

To make these selections, in at least one embodiment, a left arrow 316 and a right arrow 318 may be displayed within symbol display area 302. A player may use left arrow 316 and/or right arrow 318 to select and/or discard a player-selectable symbol from the sequence (e.g., by pressing one of the arrows 316, 318 on a touch-screen display, as "keep" or "discard" actions). In other embodiments, as described below, an up arrow and/or a down arrow may be provided to accomplish substantially the same function. For example, secondary game display 242 may include a touchscreen display, such that a player may touch left arrow 316 and/or right arrow 318 to select ("keep") and/or discard a symbol in the sequence of player-selectable symbols or swipe in a pre-defined direction for each of those actions. In some embodiments, a player may also select or discard symbols from the sequence using one or more physical buttons (e.g., buttons on player tracking interface 232), and/or using any other suitable input function. In other embodiments, the player may swipe in a pre-defined direction on a touchscreen display (e.g., down or right) to keep a symbol or may swipe in another pre-defined direction (e.g., up or left) to discard the symbol.

Further, in at least some embodiments, an EGM 104A-104X may include one or more cameras, such as one or more video cameras or motion capture cameras, which may record one or more video images of a player. Game controller 202 may receive and analyze one or more images of a player to determine one or more player gestures, such as one or more symbol selection (e.g., right-swiping or down-swiping) and/or symbol discarding (e.g., left-swiping or up-swiping) gestures. Thus, a variety of mechanisms may be used to determine whether a player wishes to select a particular player-selectable symbol and/or discard a particular player-selectable symbol.

Accordingly, in the exemplary embodiment, each player-selectable symbol of the sequence of player-selectable symbols presented within symbol display area 302 may be selected for addition to matrix 311 or discarded by the player. If a symbol is selected by the player, game controller 202 may add the symbol to a corresponding symbol position of an empty player-populated symbol position 320, as described above. For example, a player may "swipe right," using any of the mechanisms described herein, to indicate that the player would like to "keep" the symbol for addition to an empty symbol position. Similarly, a player may "swipe left," using any of the mechanisms described herein, to indicate that the player would like to discard the symbol. In other embodiments, the reverse may be true (e.g., a player may swipe right to discard a symbol and left to keep a symbol).

When the player selects a symbol to keep when there are multiple available (e.g., empty) player-populated symbol positions 320 available, in some embodiments, game controller 202 may add the symbol to the left-most available player-populated symbol position 320 (e.g., player-populated symbol position 320C). In other embodiments, game controller 202 may add the symbol to the highest available player-populated symbol position 320 (e.g., player-populated symbol position 320A). In still other embodiments, game controller 202 may allow the player to determine which empty player-populated symbol position 320 they wish to put the selected symbol (e.g., drag and drop the symbol into an available position 320, touch the available position 320, and such).

In various embodiments, if a player swipes left or otherwise indicates that a symbol should be discarded, game controller 202 may animate the symbol (e.g., symbol 314), such that the symbol appears to "fly off" of a left side of symbol display area 302. Likewise, if a player swipes right, or otherwise indicates that a symbol should be kept or added to an available player-populated symbol position 320, game controller 202 may animate the symbol, such that the symbol appears to "fly off" of a right side of symbol display area 302 (e.g., in addition to populating the player-populated symbol position 320). In some embodiments, game controller 202 may also animate a symbol that a player has indicated he or she wishes to keep, such that the symbol appears to "fly" into the empty player-populated symbol position 320. Thus, a variety of symbol animations are contemplated by the present disclosure, and no particular symbol animation described herein should be construed as limiting the scope of the present disclosure.

Further, in some embodiments, a player may swipe up or down rather than left or right. For example, in at least one embodiment, a player may swipe up to discard a symbol and down to keep a symbol for addition to matrix 311 of symbol positions. In such an embodiment, an "up-swipe" may cause a player-selectable symbol to fly upwards off of symbol display area 302, while a "down-swipe" may cause a player-selectable symbol to fly down into a player-populated symbol position 320 of matrix 311.

Broadly then, player gestures may be of two types. Specifically, player gestures may be "discard gestures," such as left-swipes and/or up-swipes, or "keep" or "add" gestures, such as right-swipes or down-swipes. As described above, discard gestures may cause a player-selectable symbol (e.g., symbol 314) to be discarded, while add gestures may cause the addition of the player-selectable symbol to an empty player-populated symbol position 320 of matrix 311.

In response to an add gesture, game controller 202 may add a player-selectable symbol (e.g., player-selectable symbol 314) to an empty player-populated symbol position 320 of matrix 311 (step 412). Likewise, in response to a discard gesture, game controller may remove or discard the symbol 314 (e.g., by animating the symbol, as described above) from symbol display area 302 and present a next player-selectable symbol in the sequence of player-selectable symbols in symbol display area 302. The player may discard or add this symbol as well, such as by way of any of the player gestures described above, and this process of adding or discarding symbols may continue until all (or a subset) of the empty player-populated symbol positions 320 within matrix 311 are filled by player selected symbols.

Further, in some embodiments, the player may be limited to the predefined number of discard actions, D, such as, for example, two discards (e.g., D=2). Once the player has discarded a number of symbols equal to the predefined number of discards, D, game controller 202 may require that the player select additional symbols in the sequence of player-selectable symbols for addition to matrix 311 until all player-populated symbol positions 320 are filled. In some embodiments, game controller 202 may auto-populate remaining empty player-populated symbol positions 320 within matrix 311 with a corresponding number of unselected player-selectable symbols from the sequence. In some embodiments, the remaining empty player-populated symbol positions 320 may be removed and replaced by symbols from the reel (e.g., based on the reel spin).

Figure 5:
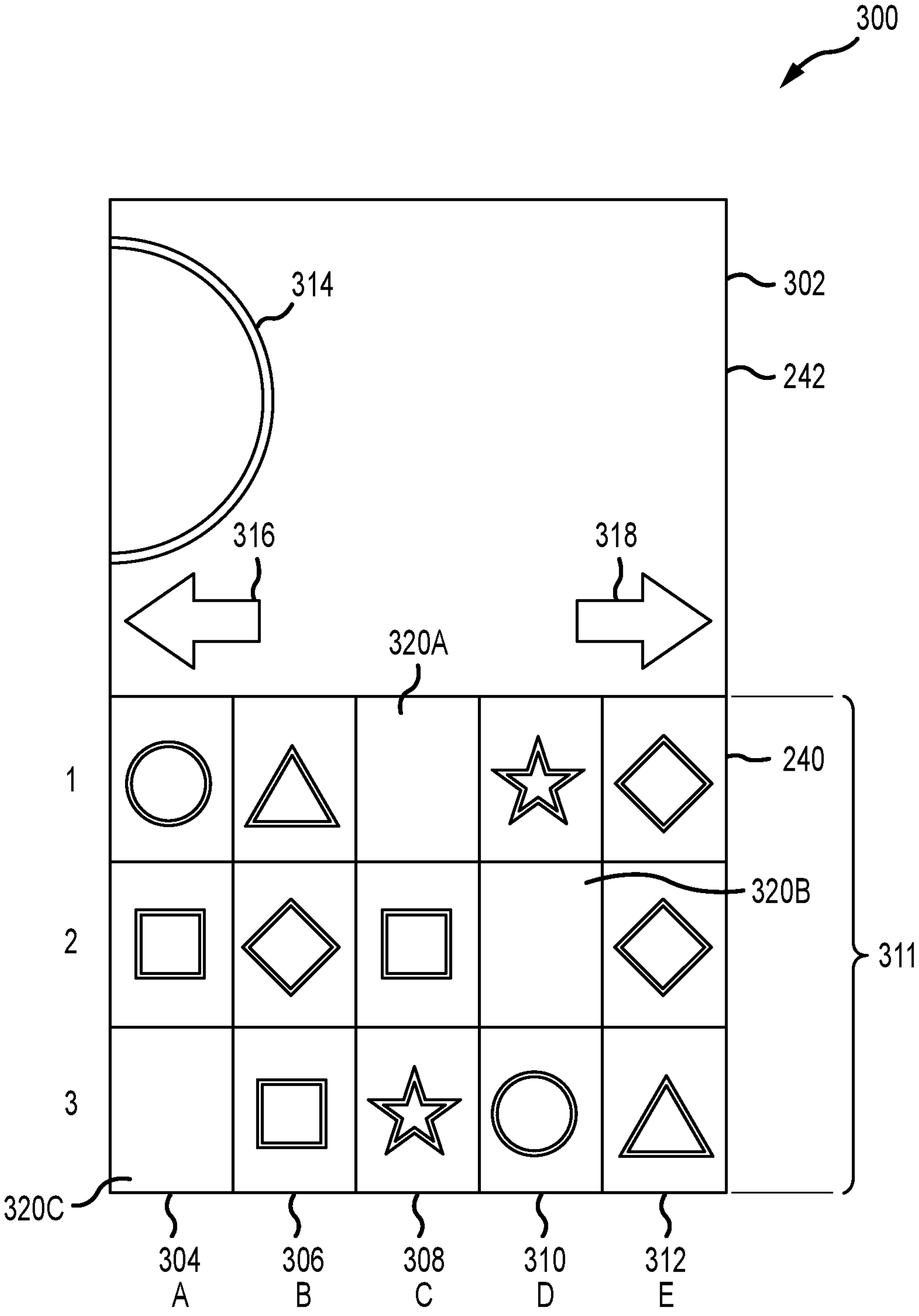
FIG. 5 is a schematic view of the exemplary wagering game shown in FIG. 3, in which the option to discard the first symbol is selected by the player, and in which the first symbol is discarded.

Accordingly, with continuing reference to the example of FIG. 3, first player-selectable symbol 314 of the sequence is displayed and may be kept or discarded by the player. In this example, first player-selectable symbol 314 is discarded by the player (e.g., with a discard gesture). FIG. 5 is a schematic view of the exemplary wagering game shown in FIG. 3, in which the option to discard the first symbol is selected by the player, and in which a first player-selectable symbol 314 is discarded. More specifically, as shown with reference to FIG. 5, the player swipes left on first player-selectable symbol 314, and game controller 202, in response, animates first player-selectable symbol 314 such that first player-selectable symbol appears to "fly off" a left side of symbol display area 302. As described herein, however, the player may swipe up to discard first player-selectable symbol 314, or perform another "discard" gesture, as described herein. As shown, because first player-selectable symbol 314 is not selected by the player for addition to matrix 311 of symbol positions, symbol 314 is not added to matrix 311, and the three player-populated symbol positions 320 remain empty.

Figure 6:
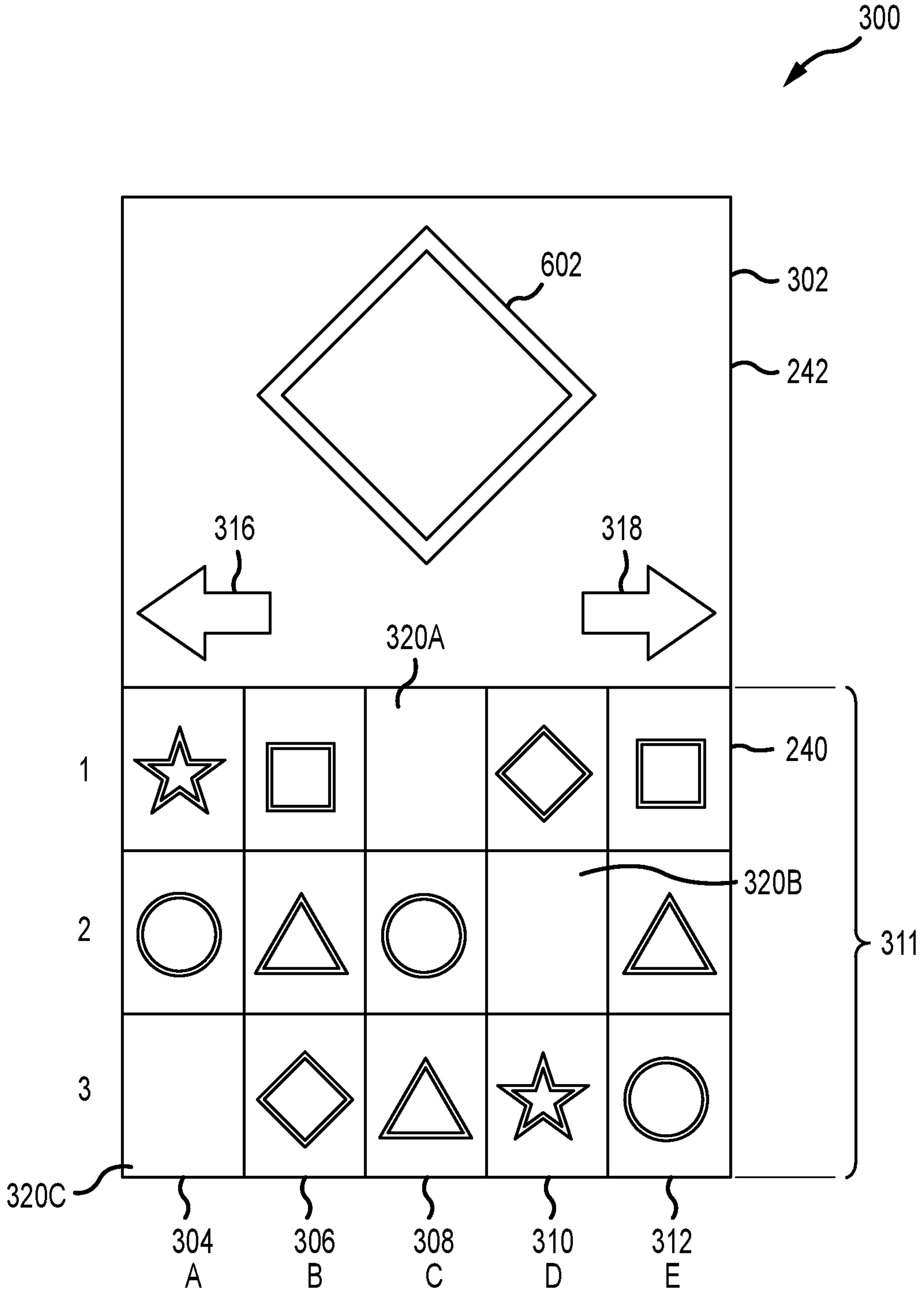
FIG. 6 is a schematic view of the exemplary wagering game shown in FIG. 3, in which the player selects an option to keep or discard a second symbol.

FIG. 6 is a schematic view of the exemplary wagering game 300 shown in FIG. 3, in which the player selects an option to keep or discard a second symbol. In the example embodiment, as first player-selectable symbol 314 is discarded by the player and removed from symbol display area

302, a second player-selectable symbol 602 is displayed by game controller 202 within symbol display area 302. Second player-selectable symbol 602 is the second player-selectable symbol in the sequence of player-selectable symbols generated by game controller 202.

As shown, second player-selectable symbol 602 may be discarded or kept by the player for addition to an empty symbol position of the matrix 311. In this example, the player keeps symbol 602 by swiping right on symbol 602, which causes symbol 602 to fly off of game display area 302 to the right or down into an empty player-populated symbol position 320 (e.g., into symbol position 320C). The "keep" gesture also causes game controller 202 to determine which player-populated symbol position 320 to use for player-selectable symbol 602, and to add the player-selectable symbol 602 to the determined player-populated symbol position 320C. In the example embodiment, game controller 202 identifies the left-most player-populated symbol position (e.g., position 320C) of the empty player-populated symbol positions 320.

Figure 7:
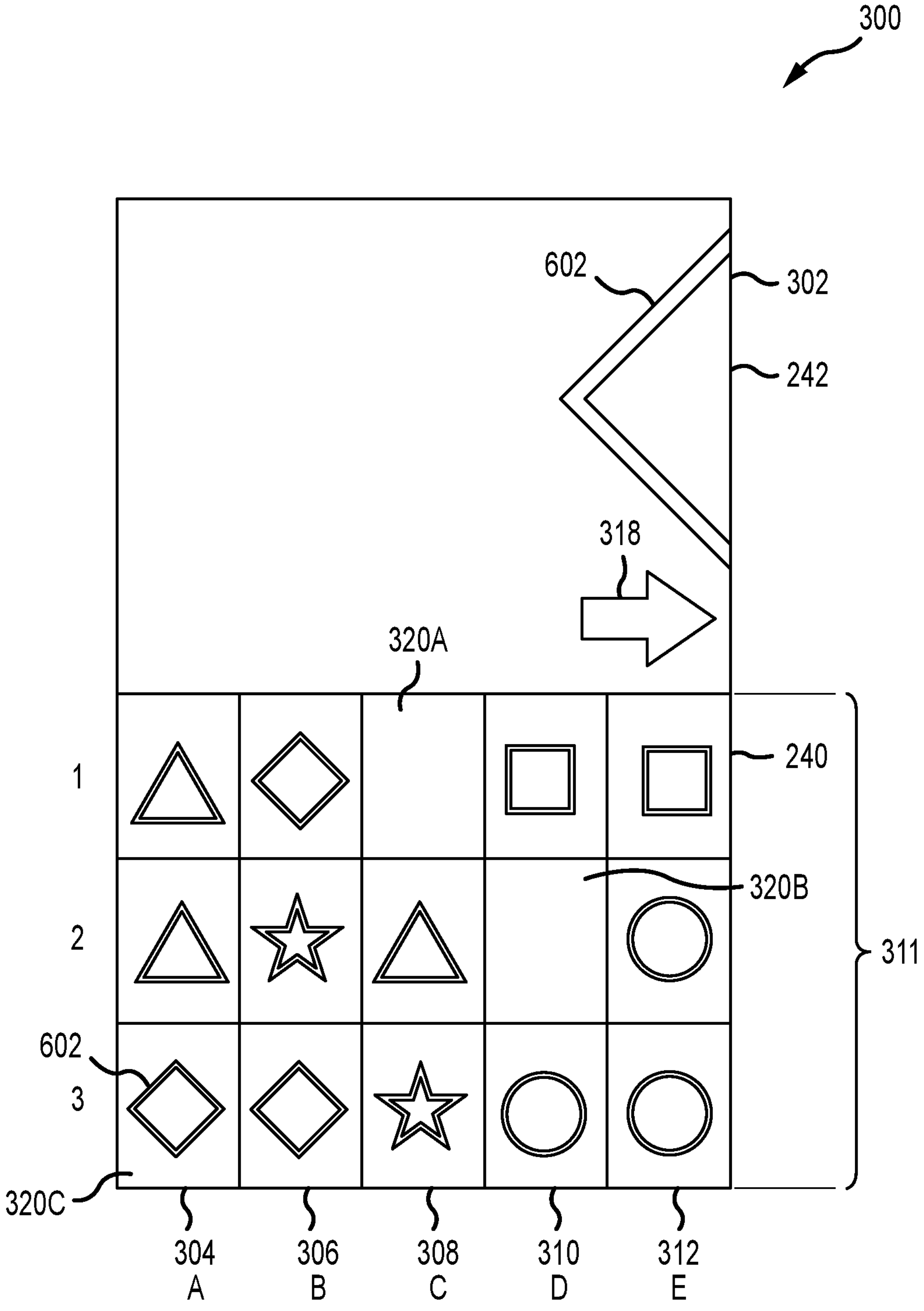
FIG. 7 is a schematic view of the exemplary wagering game shown in FIG. 5, in which the option to keep the second symbol is selected by the player.

In various embodiments, game controller 202 may add player-selectable symbols selected for addition by the player to empty player-populated symbol positions 320 of matrix 311 in any suitable order. FIG. 7 is a schematic view of the exemplary wagering game 300 shown in FIG. 5, in which the option to keep a second player-selectable symbol 602 is selected by the player. In the example of FIG. 7, game controller 202 adds player selected player-selectable symbols to empty player-populated symbol positions 320 from left to right. In other embodiments, game controller 202 may add player-selectable symbols to matrix 311 from right to left, top to bottom, based on special symbol position, or in any other order or combination, such as, for example, in a random order.

Figure 8:
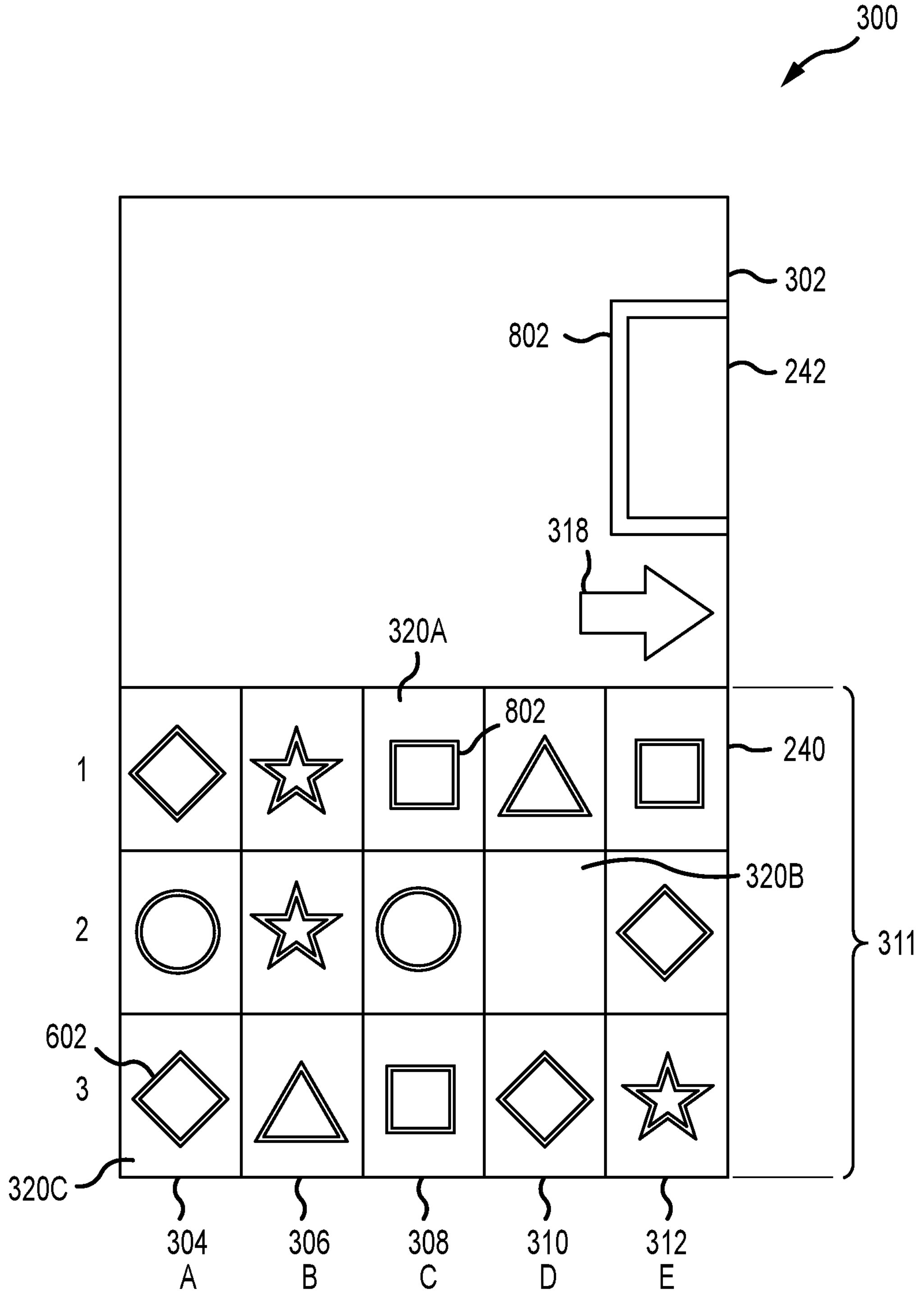
FIG. 8 is a schematic view of the exemplary wagering game shown in FIG. 3, in which a player selects an option to keep or discard a third symbol.

As described above, the process of symbol selection and discarding or addition to matrix 311 may continue until all empty player-populated symbol positions 320 of matrix 311 are filled. A third player-selectable symbol 802 is depicted in FIG. 8 to illustrate the ongoing process of symbol selection and discarding or addition. In this example, the player selects the third player-selectable symbol 802 for addition to the matrix 311, and third player-selectable symbol 802 is added to a next empty player-populated symbol position (e.g., player-populated symbol position 320A). Again, the process of symbol addition to matrix 311 may continue until all empty symbol positions are filled. If the player exhausts all of their discard actions prior to filling all of the empty player-populated symbol positions 320, then game controller 202 may automatically populate the remaining empty player-populated symbol positions 320 as described above.

Further, in the exemplary embodiment, once all empty player-populated symbol positions 320 are filled with symbols selected by the player from the sequence of player-selectable symbols displayed in symbol display area 302, game controller 202 may stop each of reels 304-312, which may, as described above, have been continuously spinning from the time first player-selectable symbol 314 was displayed (step 414). The player-selectable symbols may overlay a reel symbol at the player-populated symbol position. In some embodiments, each empty player-populated symbol position may continuously spin, even as player-selectable symbols are added to the player-populated symbol positions 320. Similarly, and in other embodiments, each empty player-populated symbol position 320 may not rotate or spin as player-selectable symbols are added, but instead remain stationary while reels 304-312 spin in one or more rows and/or columns around the empty symbol positions 320.

In either embodiment, game controller 202 may evaluate all of the symbols, including player selected symbols, stopped and displayed in matrix 311 (step 416). For example, as those of skill may appreciate, game controller 202 may evaluate each of these symbols against a paytable of symbol combinations. If the symbols stopped and displayed within matrix 311, including the displayed player selected symbols, match a combination of symbols in the paytable corresponding to a winning game outcome, game controller may indicate the winning game outcome to the player and/or provide a game award, such as a game credit and/or monetary award, to the player in association with the winning game outcome. The game credit and/or monetary award may be added by game controller 202 to a credit balance of the player and used by the player to fund subsequent spins of reels 304-312.

In the example embodiment, wagering game 300 is provided as a feature or bonus game that is activated based on events occurring in a base game (not shown). For example, the player may have achieved three feature symbols (not shown) within an outcome of the base game, and the base game may be configured to initiate wagering game 300 in response to three or more feature symbols appearing in the outcome of the base game. In other embodiments, wagering game 300 may be provided within the base game offered by game controller 202. Further, in some embodiments, the game controller 202 may be configured to provide multiple spins associated with wagering game 300. In some such embodiments, the player may select one set of player-selectable symbols and those selected symbols may be used across multiple spins. For example, the three selected symbols may remain fixed and present ("sticky") for five bonus spins, with the outcome of each spin including the three selected symbols in the same player-populated symbol positions 320. As such, wagering game 300 may evaluate five different spin outcomes of the feature game, each of which has the three selected symbols in the fixed positions 320. In other embodiments, wagering game 300 allows the player to (re)select symbols during each bonus spin.

In the example embodiment, wagering game 300 is provided as a part of a Class III electronic gaming machine. In some embodiments, game controller 202 may provide wagering game 300 as a Class II main game or feature game. In Class II environments, the gaming machines administer various wagering games based on bingo games. Typically, with some Class II gaming machines, a display façade is provided that simulates a slot machine (e.g., spinning mechanical or virtual reels), and the façade shown to the player reflects a slot evaluation outcome consistent with the outcome determined based on the underlying bingo game. Such façades are usually pre-created for various win amounts, and the game controller selects a pre-created façade based on the win amount achieved by the player. Here, since some of the symbols are player-selected, game controller 202 may automatically generate a façade for wagering game 300 in Class II environments. More specifically, game controller 202 generates a façade having the player-populated symbol positions 320 populated with the selected symbols, and the game controller 202 populates the other symbol positions of the matrix 311 such as to generate a win amount consistent with the bingo outcome, or some subset thereof. In other words, each generated façade will include the player-selected symbols fixed in the player-populated symbol positions 320 and a spin simulation visually similar to that described above, with the outcome of each spin determined to control the outcome of the matrix 311 as compared to a paytable.

Thus, a wagering game is provided. The wagering game may include a plurality of reels and a symbol display area. The plurality of reels may define a matrix of symbol positions, some of which may be empty, and some of which may be filled or populated from the reels as they are spun and stopped. During play of the wagering game, a sequence of player-selectable symbols may be displayed in the symbol display area as the reels are spun. A player may select one or more of these player-selectable symbols for addition to empty symbol positions of the matrix. Likewise, the player may discard any of these player-selectable symbols to exclude the discarded symbol or symbol from empty symbol positions of the matrix. A variety of player gestures may be used to control an action taken with respect to each player-selectable symbol. For example, an "add gesture," such as a right-swipe and/or an up-swipe, may cause a displayed player-selectable symbol to be added to an empty symbol position of the matrix. Conversely, a "discard gesture," such as a left-swipe and/or a down-swipe, may cause a displayed player-selectable symbol to be discarded, such that the discarded symbol is not added to the matrix. When at least some of the empty symbol positions of the matrix are filled with player selected player-selectable symbols, the reels may be stopped and the symbols in each symbol position of the matrix, including symbols from the reels and player selected player-selectable symbols, may be evaluated to determine whether the player has achieved a winning game outcome.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:

at least one display device comprising a touchscreen display;

at least one memory with instructions and gesture rules stored thereon, the gesture rules including a plurality of predefined gesture directions associated with a plurality of gestures, the plurality of gestures comprising one or more add gestures and one or more discard gestures; and at least one processor in communication with the at least one memory, wherein the instructions, when executed by the at least one processor, cause the at least one processor to:

cause display of a first display area on the at least one display device, the first display area including a plurality of symbol positions for a play of an electronic game;

cause a subset of symbol positions of the plurality of symbol positions to be displayed with a display overlay that causes the subset of symbol positions to remain fixed while other symbol positions of the plurality of symbol positions spin;

receive an output from a random number generator (RNG);

cause display of a first player-selectable symbol from a sequence of player-selectable symbols in a second display area on the at least one display device based upon the output from the RNG;

receive a first gesture in a first direction at the touchscreen display, the first gesture being received across a first distance between the first display area and a first symbol position of the subset of symbol positions in the second display area;

determine that the first gesture in the first direction and being the first distance satisfies a first gesture rule of the gesture rules stored in the at least one memory, wherein the first gesture rule defines a first add gesture of the one or more add gestures and is associated with the first player-selectable symbol, the first symbol position, and the play of the electronic game; and based on the first gesture satisfying the first gesture rule in the at least one memory:

automatically cause the first player-selectable symbol to transition from being displayed in the second display area of the at least one display device to being included in the display overlay at the first symbol position of the subset of symbol positions and being displayed in the first symbol position of the subset of symbol positions in the first display area of the at least one display device; and automatically cause a second player-selectable symbol from the sequence of player-selectable symbols to be displayed in the second display area of the at least one display device, wherein the second player-selectable symbol is eligible to be added to the plurality of symbol positions in the first display area of the at least one display device for the play of the electronic game;

receive a second gesture in a second direction at the touchscreen display, the second gesture being received across a second distance of the first display area and not extending to the second display area;

determine that the second gesture in the second direction and being the second distance satisfies a second gesture rule of the gesture rules stored in the at least one memory, wherein the second gesture rule defines a second add gesture of the one or more add gestures, and wherein the second gesture is associated with the second player-selectable symbol and the play of the electronic game; and based upon the second gesture satisfying the second gesture rule and not extending to the second display area:

randomly determine a second symbol position of the subset of symbol positions to assign to the second player-selectable symbol; and automatically cause the second player-selectable symbol to transition from being displayed in the second display area of the at least one display device to being included in the display overlay at the second symbol position of the subset of symbol positions and being displayed in the second symbol position of the subset of symbol positions in the first display area of the at least one display device.

2. The electronic gaming device of claim 1, wherein the plurality of symbol positions comprises a plurality of reels, and wherein the instructions further cause the at least one processor to cause the first player-selectable symbol to be added during a spin of the plurality of reels.

3. The electronic gaming device of claim 1, wherein the instructions further cause the at least one processor to cause the second player-selectable symbol to be added to the second symbol position based on a predetermined order.

4. The electronic gaming device of claim 3, wherein the predetermined order is from left to right.

5. The electronic gaming device of claim 1, wherein the at least one processor is further programmed to identify a discard gesture of the one or more discard gestures, wherein the electronic gaming device further comprises a camera, and wherein the instructions further cause the at least one processor to, based on the discard gesture being received during the electronic game once a third player-selectable symbol is displayed for the play of the electronic game, cause display of the third player-selectable symbol to be removed from the second display area and not added to the plurality of symbol positions, wherein receiving the discard gesture comprises:

receiving, by the at least one processor, one or more images of a player from the camera; and determining, by the at least one processor, that the one or more images comprise the discard gesture.

6. The electronic gaming device of claim 5, wherein the instructions further cause the at least one processor to cause a fourth player-selectable symbol from the sequence of player-selectable symbols to be displayed in the second display area based on the third player-selectable symbol being removed from the second display area, wherein the fourth player-selectable symbol is eligible to be added to the plurality of symbol positions in the first display area for the play of the electronic game.

7. The electronic gaming device of claim 5, wherein the instructions further cause the at least one processor to:

determine that a predetermined maximum number of discarded symbols has not been met; and based on the discard gesture and the determination that the predetermined maximum number of discarded symbols has not been met, cause display of the third player-selectable symbol to be removed from the second display area and not added to the plurality of symbol positions.

8. The electronic gaming device of claim 1, wherein the instructions further cause the at least one processor to cause a plurality of player-selected symbols to be added to a predetermined subset of the plurality of symbol positions, wherein the plurality of player-selected symbols includes the first player-selectable symbol, and wherein the predetermined subset of the plurality of symbol positions includes the first symbol position.

9. The electronic gaming device of claim 1, wherein the first gesture comprises one of a right swipe or a left swipe.

10. The electronic gaming device of claim 1, wherein the first gesture comprises a drag and drop gesture.

11. At least one non-transitory computer-readable storage medium with instructions and gesture rules stored thereon, the gesture rules including a plurality of predefined gesture directions associated with a plurality of gestures, the plurality of gestures comprising one or more add gestures and one or more discard gestures, wherein the instructions in response to execution by at least one processor, cause the at least one processor to:

cause display of a first display area on at least one display device, the first display area including a plurality of symbol positions for a play of an electronic game;

cause a subset of symbol positions of the plurality of symbol positions to be displayed with a display overlay that causes the subset of symbol positions to remain fixed while other symbol positions of the plurality of symbol positions spin;

receive an output from a random number generator (RNG);

cause display of a first player-selectable symbol from a sequence of player-selectable symbols in a second display area on the at least one display device based upon the output from the RNG;

receive a first gesture in a first direction at a touchscreen, the first gesture being received across a first distance between the first display area and a first symbol position of the subset of symbol positions in the second display area;

determine that the first gesture in the first direction and being the first distance satisfies a first gesture rule of the gesture rules stored in the at least one non-transitory computer-readable storage medium, wherein the first gesture rule defines a first add gesture of the one or more add gestures and is associated with the first player-selectable symbol, the first symbol position, and the play of the electronic game; and based on the first gesture satisfying the first gesture rule in the at least one non-transitory computer-readable storage medium:

automatically cause the first player-selectable symbol to transition from being displayed in the second display area of the at least one display device to being included in the display overlay at the first symbol position of the subset of symbol positions and being displayed in the first symbol position of the subset of symbol positions in the first display area of the at least one display device; and automatically cause a second player-selectable symbol from the sequence of player-selectable symbols to be displayed in the second display area of the at least one display device, wherein the second player-selectable symbol is eligible to be added to the plurality of symbol positions in the first display area of the at least one display device for the play of the electronic game;

receive a second gesture in a second direction at the touchscreen, the second gesture being received across a second distance of the first display area and not extending to the second display area;

determine that the second gesture in the second direction and being the second distance satisfies a second gesture rule of the gesture rules stored in the at least one non-transitory computer-readable storage medium, wherein the second gesture rule defines a second add gesture of the one or more add gestures, and wherein the second gesture is associated with the second player-selectable symbol and the play of the electronic game; and based upon the second gesture satisfying the second gesture rule and not extending to the second display area:

randomly determine a second symbol position of the subset of symbol positions to assign to the second player-selectable symbol; and automatically cause the second player-selectable symbol to transition from being displayed in the second display area of the at least one display device to being included in the display overlay at the second symbol position of the subset of symbol positions and being displayed in the second symbol position of the subset of symbol positions in the first display area of the at least one display device.

12. The at least one non-transitory computer-readable storage medium of claim 11, wherein the plurality of symbol positions comprises a plurality of reels, and wherein the instructions further cause the at least one processor to cause the first player-selectable symbol to be added during a spin of the plurality of reels.

13. The at least one non-transitory computer-readable storage medium of claim 11, wherein the instructions further cause the at least one processor to cause the second player-selectable symbol to be added to the second symbol position based on a predetermined order.

14. The at least one non-transitory computer-readable storage medium of claim 13, wherein the predetermined order is from left to right.

15. The at least one non-transitory computer-readable storage medium of claim 11, wherein the at least one processor is further programmed to identify a discard gesture of the one or more discard gestures, and wherein the instructions further cause the at least one processor to, based on the discard gesture being received during the electronic game once a third player-selectable symbol is displayed for the play of the electronic game, cause display of the third player-selectable symbol to be removed from the second display area and not added to the plurality of symbol positions.

16. The at least one non-transitory computer-readable storage medium of claim 15, wherein the instructions further cause the at least one processor to cause a fourth player-selectable symbol from the sequence of player-selectable symbols to be displayed in the second display area based on the third player-selectable symbol being removed from the second display area, wherein the fourth player-selectable symbol is eligible to be added to the plurality of symbol positions in the first display area for the play of the electronic game.

17. The at least one non-transitory computer-readable storage medium of claim 15, wherein the instructions further cause the at least one processor to:

determine that a predetermined maximum number of discarded symbols has not been met; and based on the discard gesture and the determination that the predetermined maximum number of discarded symbols has not been met, cause display of the third player-selectable symbol to be removed from the second display area and not added to the plurality of symbol positions.

18. The at least one non-transitory computer-readable storage medium of claim 11, wherein the instructions further cause the at least one processor to cause a plurality of player-selected symbols to be added to a predetermined subset of the plurality of symbol positions, wherein the plurality of player-selected symbols includes the first player-selectable symbol, and wherein the predetermined subset of the plurality of symbol positions includes the first symbol position.

19. The at least one non-transitory computer-readable storage medium of claim 11, wherein the first gesture comprises one of a right swipe or a left swipe.

20. An electronic gaming system comprising:

at least one display device comprising a touchscreen display;

at least one memory with instructions and gesture rules stored thereon, the gesture rules including a plurality of predefined gesture directions associated with a plurality of gestures, the plurality of gestures comprising one or more add gestures and one or more discard gestures; and at least one processor in communication with the at least one memory, wherein the instructions, when executed by the at least one processor, cause the at least one processor to:

cause display of a first display area on the at least one display device, the first display area comprising a plurality of symbol positions for a play of an electronic game;

cause a subset of symbol positions of the plurality of symbol positions to be displayed with a display overlay that causes the subset of symbol positions to remain fixed while other symbol positions of the plurality of symbol positions spin;

receive an output from a random number generator (RNG);

cause display of a first player-selectable symbol from a sequence of player-selectable symbols in a second display area on the at least one display device based upon the output from the RNG;

receive a first gesture in a first direction at the touchscreen display, the first gesture being received across a first distance between the first display area and a first symbol position of the subset of symbol positions in the second display area;

determine that the first gesture in the first direction and being the first distance satisfies a first gesture rule of the gesture rules stored in the at least one memory, wherein the first gesture rule defines a first add gesture of the one or more add gestures and is associated with the first player-selectable symbol, the first symbol position, and the play of the electronic game; and in response to the first gesture satisfying the first gesture rule in the at least one memory:

automatically cause the first player-selectable symbol to transition from being displayed in the second display area of the at least one display device to being included in the display overlay at the first symbol position of the subset of symbol positions and being displayed in the first symbol position of the subset of symbol positions in the first display area of the at least one display device; and automatically cause a second player-selectable symbol from the sequence of player-selectable symbols to be displayed in the second display area of the at least one display device, wherein the second player-selectable symbol is eligible to be added to the plurality of symbol positions in the first display area of the at least one display device for the play of the electronic game;

receive a second gesture in a second direction at the touchscreen display, the second gesture being received across a second distance of the first display area and not extending to the second display area;

determine that the second gesture in the second direction and being the second distance satisfies a second gesture rule of the gesture rules stored in the at least one memory, wherein the second gesture rule defines a second add gesture of the one or more add gestures, and wherein the second gesture is associated with the second player-selectable symbol and the play of the electronic game; and based upon the second gesture satisfying the second gesture rule and not extending to the second display area:

randomly determine a second symbol position of the subset of symbol positions to assign to the second player-selectable symbol; and automatically cause the second player-selectable symbol to transition from being displayed in the second display area of the at least one display device to being included in the display overlay at the second symbol position of the subset of symbol positions and being displayed in the second symbol position of the subset of symbol positions in the first display area of the at least one display device.

* * * * *